US010681509B2

(12) United States Patent
Mei et al.

(10) Patent No.: US 10,681,509 B2
(45) Date of Patent: Jun. 9, 2020

(54) SERVICE PROCESSING METHOD AND TERMINAL

(71) Applicant: Huawei Technologies Co., Ltd., Shenzhen, Guangdong (CN)

(72) Inventors: Jingqing Mei, Beijing (CN); Xinmiao Chang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 86 days.

(21) Appl. No.: 15/570,600

(22) PCT Filed: Apr. 30, 2015

(86) PCT No.: PCT/CN2015/078135
§ 371 (c)(1),
(2) Date: Oct. 30, 2017

(87) PCT Pub. No.: WO2016/172977
PCT Pub. Date: Nov. 3, 2016

(65) Prior Publication Data
US 2018/0288580 A1 Oct. 4, 2018

(51) Int. Cl.
*H04W 4/20* (2018.01)
*H04W 8/00* (2009.01)
(Continued)

(52) U.S. Cl.
CPC ............ *H04W 4/203* (2013.01); *H04W 4/50* (2018.02); *H04W 4/80* (2018.02); *H04W 8/005* (2013.01);
(Continued)

(58) Field of Classification Search
CPC combination set(s) only.
See application file for complete search history.

(56) References Cited

U.S. PATENT DOCUMENTS

2003/0076301 A1* 4/2003 Tsuk ............... G06F 1/1626
345/159
2007/0001853 A1* 1/2007 Otranen ............ G06K 7/0008
340/572.1
(Continued)

FOREIGN PATENT DOCUMENTS

CN 101154238 A 4/2008
CN 101233699 A 7/2008
(Continued)

OTHER PUBLICATIONS

NXP Semiconductors, "NFC Forum Type Tags White Paper V1.0"; Apr. 1, 2009; 24 pages.

*Primary Examiner* — Zhitong Chen
(74) *Attorney, Agent, or Firm* — Slater Matsil, LLP

(57) ABSTRACT

The present invention provides a service processing method and a terminal, and relates to the communications field, so as to display an intention (intention), so that a user can freely select a to-be-executed intention. A first communications terminal determines L intentions, where both the first communications terminal and a second communications terminal support an application, the application supports the L intentions, and L is an integer greater than or equal to 1; the first communications terminal displays at least one of the L intentions; the first communications terminal determines a to-be-executed intention according to a trigger operation of a user; and the first communications terminal transmits data corresponding to the to-be-executed intention to the second communications terminal.

18 Claims, 5 Drawing Sheets

(51) Int. Cl.
*H04W 76/10* (2018.01)
*H04W 76/14* (2018.01)
*H04W 4/50* (2018.01)
*H04W 4/80* (2018.01)
*H04W 84/18* (2009.01)

(52) U.S. Cl.
CPC .......... *H04W 76/10* (2018.02); *H04W 76/14* (2018.02); *H04W 84/18* (2013.01)

(56) References Cited

U.S. PATENT DOCUMENTS

| | | |
|---|---|---|
| 2008/0091706 A1 | 4/2008 | Suzuki et al. |
| 2015/0012515 A1 | 1/2015 | Taichman et al. |

FOREIGN PATENT DOCUMENTS

| | | | | |
|---|---|---|---|---|
| CN | 103078670 A | | 5/2013 | |
| CN | 103476002 A | * 12/2013 | | ............ H04W 4/02 |
| CN | 104270823 A | | 1/2015 | |
| CN | 104539686 A | | 4/2015 | |
| EP | 2669795 A1 | | 12/2013 | |
| WO | 9636960 A1 | | 11/1996 | |
| WO | 2014160309 A1 | | 10/2014 | |

\* cited by examiner

SERVICE PROCESSING METHOD AND TERMINAL

CROSS-REFERENCE TO RELATED APPLICATIONS

This application is a national stage of International Application No. PCT/CN2015/078135, filed on Apr. 30, 2015, which is hereby incorporated by reference in its entirety.

TECHNICAL FIELD

The present invention relates to the communications field, and in particular, to a service processing method and a terminal.

BACKGROUND

After two terminals that support NFC (Near Field Communication, near field communication) establish an NFC connection, and when a user selects an application on a first communications terminal, the first communications terminal receives indication information sent by a second communications terminal, and determines an intention (intention) supported by the second communications terminal. The first communications terminal exchanges information about a candidate communication bearer with the second communications terminal, and may further establish a candidate channel with the second communications terminal. The first communications terminal transmits, by using the candidate channel, data corresponding to an intention (an intention supported by the second communications terminal) supported by the application. For example, when the user opens a browser and browses a picture, a corresponding intention may include: transferring a URL (Uniform Resource Locator, uniform resource locator) that is being browsed in the browser to a peer end; or transferring the picture that is being browsed to a peer end. When the user opens an App (Application, application), a corresponding intention may include: transferring a download address of the App to a peer end; or transferring a screenshot of the App to a peer end. The first communications terminal may send, by using the candidate channel, the picture that is being browsed to the second communications terminal.

In the foregoing process, after the user selects an application by using the first communications terminal and the first communications terminal establishes a subsequent communication bearer with the second communications terminal, a final intention executed by the first communications terminal by using the candidate channel is predetermined by an operating system of the first communications terminal or the currently running App, and the user cannot determine the final intention executed by the terminal.

SUMMARY

Embodiments of the present invention provide a service processing method and a terminal, so as to display an intention, so that a user may freely select a to-be-executed intention.

To achieve the foregoing objective, the following technical solutions are used in the embodiments of the present invention:

According to a first aspect, a service processing method is disclosed, and the method includes:

determining, by a first communications terminal, L intentions (intention), where both the first communications terminal and a second communications terminal support an application, the application supports the L intentions, and L is an integer greater than or equal to 1;

displaying, by the first communications terminal, at least one of the L intentions;

determining, by the first communications terminal, a to-be-executed intention according to a trigger operation of a user; and transmitting, by the first communications terminal, data corresponding to the to-be-executed intention to the second communications terminal.

With reference to the first aspect, in a first possible implementation manner of the first aspect, the determining, by a first communications terminal, L intentions specifically includes:

obtaining, by the first communications terminal, identification information of M first-type intentions supported by the application and identification information of N second-type intentions supported by the application, where the first-type intention is an intention supported by both the first communications terminal and the second communications terminal, the second-type intention is an intention that is supported by the first communications terminal and that requires determining of whether the second communications terminal supports, and both M and N are integers greater than or equal to zero;

sending, by the first communications terminal, a first query message to the second communications terminal by using a first communication bearer between the first communications terminal and the second terminal, where the first query message carries the identification information of the N second-type intentions; and receiving, by the first communications terminal by using the first communication bearer, a first indication message sent by the second communications terminal, where the first indication message carries identification information of X second-type intentions that are of the application and that are supported by both the first communications terminal and the second communications terminal, X is an integer greater than or equal to zero, and a sum of M and X is equal to L.

With reference to the first aspect, in a second possible implementation manner of the first aspect, the determining, by a first communications terminal, L intentions specifically includes:

obtaining, by the first communications terminal, identification information of each intention in an intention set, where the intention set includes each intention supported by the application;

sending, by the first communications terminal, a second query message to the second communications terminal by using a first communication bearer between the first communications terminal and the second communications terminal, where the second query message carries the identification information of each intention in the intention set; and receiving, by the first communications terminal by using the first communication bearer, a second indication message sent by the second communications terminal, where the second indication message carries identification information of the L intentions that are of the application and that are supported by both the first communications terminal and the second communications terminal.

With reference to the first possible implementation manner of the first aspect or the second possible implementation manner of the first aspect, in a third possible implementation manner of the first aspect, the displaying, by the first communications terminal, at least one of the L intentions specifically includes:

displaying, by the first communications terminal, Y intentions, and sequentially and cyclically indicating the Y intentions according to a preset sequence, where duration between a moment of indicating a current intention and a moment of indicating a next intention of the current intention is candidate duration of the current intention, and $1 \leq Y \leq L$.

With reference to the third possible implementation manner of the first aspect, in a fourth possible implementation manner of the first aspect, the determining, by the first communications terminal, a to-be-executed intention according to a trigger operation of a user specifically includes:

recording a T1 moment, where the T1 moment is a moment of receiving the first indication message or the second indication message by the first communications terminal, or a moment of displaying the Y intentions by the first communications terminal, or any one of moments from a moment of establishing the first communication bearer between the first communications terminal and the second communications terminal to a moment of displaying the Y intentions;

recording a T2 moment, where the T2 moment is a moment of detecting the trigger operation of the user by the first communications terminal; and when $$\left( \frac{T2 - T1}{T} - \left\lfloor \frac{T2 - T1}{T} \right\rfloor \right) \times T$$

is greater than or equal to a sum of candidate duration of first j−1 intentions, and is less than or equal to a sum of candidate duration of first j intentions, determining that a $j^{th}$ intention is the to-be-executed intention; where T is a total sum of candidate duration of the Y intentions, j is an integer greater than or equal to 0 and less than Y, and ⌊ ⌋ represents rounding down.

With reference to the fourth possible implementation manner of the first aspect, in a fifth possible implementation manner of the first aspect, before the recording a T1 moment, the method further includes:

determining, by the first communications terminal, candidate duration of each intention in the Y intentions, and adding up the candidate duration of each intention in the Y intentions to obtain T; or determining T, and separately multiplying T by a time proportion coefficient of each intention in the L intentions to obtain candidate duration of each intention in the L intentions.

With reference to the fourth possible implementation manner of the first aspect, in a sixth possible implementation manner of the first aspect, the detecting, by the first communications terminal, the trigger operation of the user specifically includes: detecting, by the first communications terminal, that the first communication bearer between the first communications terminal and the second communications terminal is disconnected; or detecting, by the first communications terminal, that a preset gesture operation is performed on a screen of the first communications terminal; or detecting, by the first communications terminal, that an operation is performed on a preset key of the first communications terminal; or detecting, by the first communications terminal, input preset voice information.

According to a second aspect, a terminal is disclosed, including:

an obtaining unit, configured to determine L intentions, where both the first communications terminal and a second communications terminal support an application, the application supports the L intentions, and L is an integer greater than or equal to 1;

a display unit, configured to display at least one of the L intentions;

a determining unit, configured to determine a to-be-executed intention according to a trigger operation of a user; and a transmission unit, configured to transmit data corresponding to the to-be-executed intention to the second communications terminal.

With reference to the second aspect, in a first possible implementation manner of the second aspect, the obtaining unit further includes a sending subunit and a receiving subunit; where the obtaining unit is specifically configured to obtain identification information of M first-type intentions supported by the application and identification information of N second-type intentions supported by the application, where the first-type intention is an intention supported by both the first communications terminal and the second communications terminal, the second-type intention is an intention that is supported by the first communications terminal and that requires determining of whether the second communications terminal supports, and both M and N are integers greater than or equal to zero;

the sending subunit is configured to send a first query message to the second communications terminal by using a first communication bearer between the first communications terminal and the second terminal, where the first query message carries the identification information of the N second-type intentions; and the receiving subunit is configured to receive, by using the first communication bearer, a first indication message sent by the second communications terminal, where the first indication message carries identification information of X second-type intentions that are of the application and that are supported by both the first communications terminal and the second communications terminal, X is an integer greater than or equal to zero, and a sum of M and X is equal to L.

With reference to the second aspect, in a second possible implementation manner of the second aspect, the obtaining unit is configured to obtain identification information of each intention in an intention set, where the intention set includes each intention supported by the application;

the sending subunit is configured to send a second query message to the second communications terminal by using a first communication bearer between the first communications terminal and the second communications terminal, where the second query message carries the identification information of each intention in the intention set; and the receiving subunit is configured to receive, by using the first communication bearer, a second indication message sent by the second communications terminal, where the second indication message carries identification information of the L intentions that are of the application and that are supported by both the first communications terminal and the second communications terminal.

With reference to the first possible implementation manner of the second aspect or the second possible implementation manner of the second aspect, in a third possible implementation manner of the second aspect, the display unit is specifically configured to display Y intentions, and sequentially and cyclically indicate the Y intentions according to a preset sequence, where duration between a moment of indicating a current intention and a moment of indicating a next intention of the current intention is candidate duration of the current intention, and 1≤Y≤L.

With reference to the third possible implementation manner of the second aspect, in a fourth possible implementation manner of the second aspect, the first communications terminal further includes a detection unit; where the determining unit is specifically configured to: record a T1 moment, where the T1 moment is a moment of receiving the first indication message or the second indication message by the first communications terminal, or a moment of displaying the Y intentions by the first communications terminal, or any one of moments from a moment of establishing the first communication bearer between the first communications terminal and the second communications terminal to a moment of displaying the Y intentions;

record a T2 moment, where the T2 moment is a moment of detecting the trigger operation of the user by the detection unit; and when $$\left(\frac{T2-T1}{T} - \left\lceil \frac{T2-T1}{T} \right\rceil \right) \times T$$

is greater than or equal to a sum of candidate duration of first j−1 intentions, and is less than or equal to a sum of candidate duration of first j intentions, determine that a $j^{th}$ intention is the to-be-executed intention; where T is a total sum of candidate duration of the Y intentions, j is an integer greater than or equal to 0 and less than Y, and ⌈ ⌉ represents rounding down.

With reference to the fourth possible implementation manner of the second aspect, in a fifth possible implementation manner of the second aspect, the determining unit is further configured to: before the T1 moment is recorded, determine candidate duration of each intention in the Y intentions, and add up the candidate duration of each intention in the Y intentions to obtain T; or the determining unit is configured to determine T, and separately multiply T by a time proportion coefficient of each intention in the L intentions to obtain candidate duration of each intention in the L intentions.

With reference to the fourth possible implementation manner of the second aspect, in a sixth possible implementation manner of the second aspect, that the detection unit detects the trigger operation of the user includes: detecting that the first communication bearer between the first communications terminal and the second communications terminal is disconnected; or detecting that a preset gesture operation is performed on a screen of the first communications terminal; or detecting that an operation is performed on a preset key of the first communications terminal; or detecting input preset voice information.

According to a third aspect, a terminal is disclosed, including:

a processor, configured to determine L intentions, where both the first communications terminal and a second communications terminal support an application, the application supports the L intentions, and L is an integer greater than or equal to 1; and a display unit, configured to display at least one of the L intentions; where the processor is further configured to determine a to-be-executed intention according to a trigger operation of a user; and the processor is further configured to transmit, by using a communications interface, data corresponding to the to-be-executed intention to the second communications terminal.

With reference to the third aspect, in a first possible implementation manner of the third aspect, the determining L intentions specifically includes: obtaining identification information of M first-type intentions supported by the application and identification information of N second-type intentions supported by the application, where the first-type intention is an intention supported by both the first communications terminal and the second communications terminal, the second-type intention is an intention that is supported by the first communications terminal and that requires determining of whether the second communications terminal supports, and both M and N are integers greater than or equal to zero;

sending a first query message to the second communications terminal by using a first communication bearer between the first communications terminal and the second terminal, where the first query message carries the identification information of the N second-type intentions; and receiving, by using the first communication bearer, a first indication message sent by the second communications terminal, where the first indication message carries identification information of X second-type intentions that are of the application and that are supported by both the first communications terminal and the second communications terminal, X is an integer greater than or equal to zero, and a sum of M and X is equal to L.

With reference to the third aspect, in a second possible implementation manner of the third aspect, the determining L intentions specifically includes: obtaining identification information of each intention in an intention set, where the intention set includes each intention supported by the application;

sending a second query message to the second communications terminal by using a first communication bearer between the first communications terminal and the second communications terminal, where the second query message carries identification information of an intention supported by the application; and receiving, by using the first communication bearer, a second indication message sent by the second communications terminal, where the second indication message carries the L intentions that are of the application and that are supported by both the first communications terminal and the second communications terminal.

With reference to the first possible implementation manner of the third aspect or the second possible implementation manner of the third aspect, in a third possible implementation manner of the third aspect, the displaying at least one of the L intentions specifically includes: sequentially and cyclically indicating Y intentions according to a preset sequence, where duration between a moment of indicating a current intention and a moment of indicating a next intention of the current intention is candidate duration of the current intention, and 1≤Y≤L.

With reference to the third possible implementation manner of the third aspect, in a fourth possible implementation manner of the third aspect, the determining a to-be-executed intention according to a trigger operation of a user specifically includes: recording a T1 moment, where the T1 moment is a moment of receiving the first indication message or the second indication message by the first communications terminal, or a moment of displaying the Y intentions by the first communications terminal, or any one of moments from a moment of establishing the first communication bearer between the first communications terminal and the second communications terminal to a moment of displaying the Y intentions;

recording a T2 moment, where the T2 moment is a moment of detecting the trigger operation of the user by the processor; and when $$\left(\frac{T2-T1}{T} - \left\lceil\frac{T2-T1}{T}\right\rceil\right) \times T$$

is greater than or equal to a sum of candidate duration of first j−1 intentions, and is less than or equal to a sum of candidate duration of first j intentions, determining that a j$^{th}$ intention is the to-be-executed intention; where T is a total sum of candidate duration of the Y intentions, j is an integer greater than or equal to 0 and less than Y, and ⌈ ⌉ represents rounding down.

With reference to the fourth possible implementation manner of the third aspect, in a fifth possible implementation manner of the third aspect, the processor is further configured to: before the T1 moment is recorded, determine candidate duration of each intention in the Y intentions, and add up the candidate duration of each intention in the Y intentions to obtain T; or the processor is configured to determine T, and separately multiply T by a time proportion coefficient of each intention in the L intentions to obtain candidate duration of each intention in the L intentions.

With reference to the fourth possible implementation manner of the third aspect, in a sixth possible implementation manner of the third aspect, the detecting the trigger operation of the user specifically includes: detecting that the first communication bearer between the first communications terminal and the second communications terminal is disconnected; or detecting that a preset gesture operation is performed on a screen of the first communications terminal; or detecting that an operation is performed on a preset key of the first communications terminal; or detecting input preset voice information.

According to the service processing method and the terminal that are provided in the present invention, a first communications terminal determines L intentions (intention) and displays at least one of the L intentions; the first communications terminal determines a to-be-executed intention according to a trigger operation of a user; and the first communications terminal transmits data corresponding to the to-be-executed intention to the second communications terminal. An intention is displayed, so that the user freely selects a to-be-executed intention according to a will. Compared with the prior art in which an intention currently executed by a terminal is predetermined by an operating system or a currently running application, and a user cannot perform selection according to a will of the user, the method and the terminal that are provided in the present invention can display an intention, so that the user can freely select a to-be-executed intention.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Figure 1:
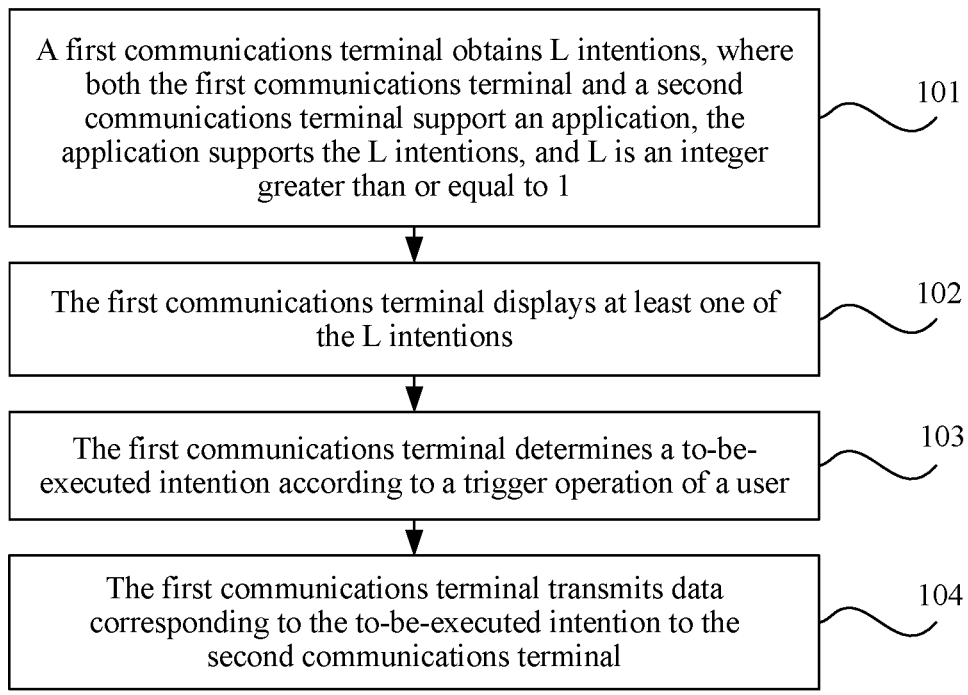
FIG. 1 is a schematic flowchart of a service processing method according to Embodiment 1 of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

The following explains and describes an intention in the present invention. When an NFC connection is established between two terminals, the two terminals may exchange, by using the NFC connection between the two terminals, information related to a candidate communication bearer, and may further transmit, by using a candidate channel between the two terminals, data corresponding to an intention. For example, when an NFC connection is established between a first communications terminal and a second communications terminal, and a user runs an application on the first communications terminal (or the user performs a preset operation on the first communications terminal), an operating system of the first communications terminal selects and executes an intention in intentions supported by the application. The user performs the preset operation on the first communications terminal, and the preset operation may be touching a screen of the first communications terminal by the user, or pressing a key on the first communications terminal, or pressing a combination of keys on the first communications terminal, or voice input of the user, or an operation that causes a disconnection of the NFC connection between the first communications terminal and the second communications terminal.

Before executing the intention, the first communications terminal needs to exchange, by using the NFC connection with the second communications terminal, information related to a candidate communication bearer, and may further establish a candidate channel between the two terminals, and the first communications terminal executes the intention by using the candidate channel with the second communications terminal. For example, if the intention that needs to be executed is sending a current URL of a browser to the second communications terminal, the established candidate channel is a bearer applicable to data transmission herein, and the first communications terminal may send the current URL to the second communications terminal by using the bearer. Alternatively, if the intention that needs to be executed is sending a picture currently displayed in a browser to the second communications terminal, the established candidate channel is a bearer applicable to picture transmission herein, and the first communications terminal may send the currently displayed picture to the second communications terminal by using the bearer.

In addition, an operating system of a terminal may determine, according to a type and registration information of an application, a type of (most) intentions supported by the application. There is no need to determine whether some intentions are supported by a peer end, and there is a need to determine whether some other intentions are supported by the peer end.

(1) An intention of a data transmission type generally can be implemented by the peer end, and determining is not required. For example, an intention of a picture transmission type: transferring a current picture, and transferring a current screenshot;

an intention of a URL (Uniform Resource Locator, uniform resource locator) transmission type: transferring a current URL, and transferring a download address of a current application; and an intention of a file transfer type: transferring an installation file of a current application.

(2) For an intention of a data connection type for establishing an upper layer application, there is a need to determine whether an intention of the data connection type is supported by the peer end. For example, an online game: transferring an account or configuration information of a current application.

In specific implementation, the terminal may describe and manage the intention by using an intention standard defined in the NFC (Near Field Communication, near field communication) Forum, and the intention may be registered with the terminal system.

Embodiment 1

This embodiment of the present invention provides a service processing method, and an execution body is a first communications terminal. As shown in FIG. 1, the method includes the following steps.

101. A first communications terminal obtains L intentions, where both the first communications terminal and a second communications terminal support an application, the application supports the L intentions (intention), and L is an integer greater than or equal to 1.

In specific implementation, the first communications terminal may obtain, in the following two manners, the L intentions that are of the application and that are supported by both the first communications terminal and the second communications terminal.

Manner 1: (a) The first communications terminal obtains identification information of M first-type intentions of the application and identification information of N second-type intentions of the application.

The first-type intention is an intention that does not require determining of the first communications terminal about whether the second communications terminal supports, and the second-type intention is an intention that is supported by the first communications terminal and that requires determining of the first communications terminal about whether the second communications terminal supports. Both the M first-type intentions and the N second-type intentions are intentions supported by the first communications terminal. The first communications terminal may determine, by using system registration information, intentions supported by the application, and determine whether the intentions need to be supported by a peer end. Both M and N are integers greater than or equal to zero, and either M or N is zero or neither M nor N is zero. For example, a terminal generally supports picture receiving, and therefore the first communications terminal does not need to determine whether an intention of a picture transmission type is supported by the second communications terminal. For an intention of an online game type, the first communications terminal needs to transfer an account or configuration information of a current application to the second communications terminal, and there is a need to determine whether an intention of this type is supported by a peer end. For example, if the second communications terminal does not support the game (for example, a related application is not downloaded), the intention cannot be executed. Therefore, the first communications terminal needs to determine whether an intention of this type is supported by the second communications terminal.

It should be noted that, before step (a), a first communication bearer is established between the first communications terminal and the second communications terminal.

(b) The first communications terminal sends a query message to the second communications terminal by using a first communication bearer, where the query message carries the identification information of the N second-type intentions.

The query message may be CHS information (defined in NFC-Forum CHS 1.4). Certainly, the query message may further carry the identification information of the M first-type intentions. This is not limited herein. In specific implementation, the first communications terminal sends the CHS information to the second communications terminal according to a definition in the NFC Forum CHS 1.4 Draft, where the CHS information carries the identification information of the N second-type intentions. The second communications terminal receives the CHS information, parses the CHS information, and obtains the identification information that is of the N second-type intentions and that is carried in the CHS information. Intentions supported by the second communications terminal in the N second-type intentions may be determined by querying intentions registered by a system.

(c) Receive an indication message sent by the second communications terminal, where the indication message is used to indicate identification information of X second-type intentions supported by the second communications terminal in the N second-type intentions, X is an integer greater than or equal to zero, and a sum of M and X is equal to L.

In specific implementation, the indication message carries the identification information of the X second-type intentions supported by the second communications terminal in the N second-type intentions. The first communications terminal parses the indication information, obtains the identification information that is of the intentions and that is carried in the indication information, and may determine the intentions supported by the second communications terminal. For example, if the identification information carried in the query information sent by the first communications terminal in step (b) is A and B, where A is identification information of an intention A, and B is identification information of an intention B. If the second communications terminal supports only the intention B, indication information that carries only B is sent to the first communications terminal, so as to indicate that the second communications terminal supports only the intention B in the intention A and the intention B. In this way, the first communications terminal parses the indication information, obtains the identification information B, and may determine that the second communications terminal supports the intention B, and does not support the intention A.

In addition, the first communication bearer and the second communication bearer each are any one in a communication bearer set, where the communication bearer set includes a near field communication NFC connection, a wireless fidelity Wi-Fi connection, a Bluetooth connection, or a Long Term Evolution direct communication LTE Direct connection.

Manner 2: (a) The first communications terminal obtains identification information of each intention in an intention set, where the intention set includes each intention supported by the application.

Specifically, identification information of all intentions supported by the application is obtained.

(b) The first communications terminal sends a second query message to the second communications terminal by using a first communication bearer between the first communications terminal and the second communications terminal, where the second query message carries the identification information of each intention in the intention set.

(c) The first communications terminal receives, by using the first communication bearer, a second indication message sent by the second communications terminal, where the second indication message carries identification information of the L intentions that are of the application and that are supported by both the first communications terminal and the second communications terminal.

102. The first communications terminal displays at least one of the L intentions.

In specific implementation, the first communications terminal may display the at least one of the L intentions on a UI (User interface, user interface).

Figure 2:
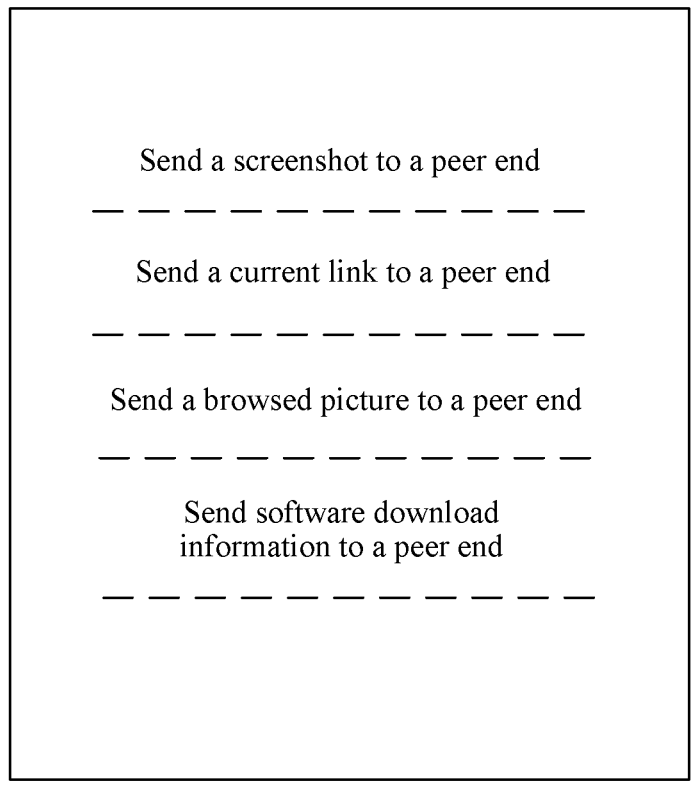
FIG. 2 is a schematic diagram of an intention list according to Embodiment 1 of the present invention.

It should be noted that the UI may be in a form of a list, as shown in FIG. 2. With reference to FIG. 2, the list displays the at least one of the L intentions, and a user may select an intention expected to be executed from the list.

If the intention expected to be executed by the user is "sending a browsed picture to a peer end", a region corresponding to "sending a browsed picture to a peer end" may be tapped on the list shown in FIG. 2, and the terminal executes "sending a browsed picture to a peer end". For example, after the first communication bearer is established between the first communications terminal and the second communications terminal, the first communications terminal runs an application C, and intentions determined to be displayed by the first communications terminal after steps 101 to 103 include: transmitting a current screenshot to a peer end; and sending an online game request message to the peer end. The user may tap and select, according to a will, an intention from the list, shown in FIG. 2, displayed on a screen of the first communications terminal. In this way, the first communications terminal executes the intention instead of executing an intention preset by an operating system.

Figure 3:
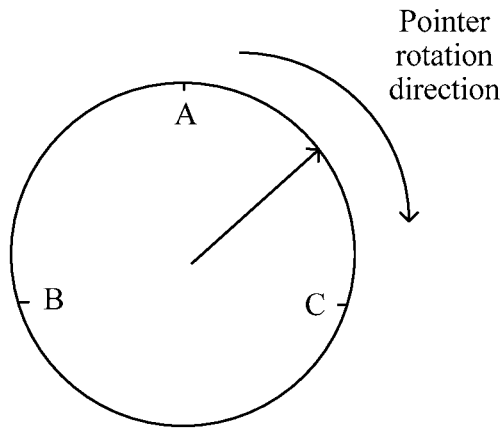
FIG. 3 is a schematic diagram of a dashboard UI according to Embodiment 1 of the present invention.

The UI may be a dynamic UI in a form of a dashboard shown in FIG. 3. The UI may also be a dynamic UI in another form, which is intended to indicate an intention corresponding to a current moment.

In specific implementation, the first communications terminal displays Y intentions on the UI, and the terminal sequentially and cyclically indicates the Y intentions on the UI according to a preset sequence, where duration between a moment of indicating a current intention and a moment of indicating a next intention of the current intention is candidate duration of the current intention, and $1 \leq Y \leq L$.

It should be noted that sequentially and cyclically indicating, on the UI according to the preset sequence, the intention corresponding to the current moment specifically includes the following steps.

(1) Record a T1 moment. The T1 moment is a moment of receiving the indication message by the first communications terminal j, or a moment of displaying the Y intentions on the UI by the first communications terminal, or any one of moments from a moment of establishing the first communication bearer between the first communications terminal and the second communications terminal to a moment of displaying the Y intentions on the UI.

(2) Arrange, according to the preset sequence, Y intentions displayed on the UI, and add up candidate duration of each intention in the Y intentions to obtain a total sum T of candidate duration of the Y intentions.

The preset sequence may be a descending sequence of the candidate duration of the intentions, or an ascending sequence of the candidate duration of the intentions, or a sequence that is set according to other priorities of the intentions, or a randomly generated sequence. This is not limited herein. The candidate duration is preset by a system, and candidate duration of an intention represents duration from the intention to a next intention on the dynamic UI. The total sum T of the candidate duration of the Y intentions is a sum of candidate duration of all intentions displayed on the UI. With reference to FIG. 3, the total sum T of the candidate duration is a time during which a dashboard pointer rotates by one circle.

For example, there are three intentions A, C, and B in total displayed on the UI dashboard (A, C, and B are arranged according to the preset sequence), and if candidate duration of the intention A is 2 s, candidate duration of the intention B is 3 s, and candidate duration of the intention C is 2 s, the total sum T of the candidate duration is 2+3+2=7 s. With reference to FIG. 3, a time during which the pointer on the UI dashboard rotates from the intention A to the intention C is the candidate duration 2 s of the intention A; a time during which the pointer on the UI dashboard rotates from the intention C to the intention B is the candidate duration 3 s of the intention C; and a time during which the pointer on the UI dashboard rotates from the intention B to the intention A is the candidate duration 2 s of the intention B. The time during which the pointer on the UI dashboard rotates around the dashboard by one circle is 2+3+2=7 s.

(3) Record a current moment T3.
(4) When $$\left(\frac{T3-T1}{T} - \left\lceil \frac{T3-T1}{T} \right\rceil\right) \times T$$

is greater than or equal to a sum of candidate duration of first i−1 intentions, and is less than or equal to a sum of candidate duration of first i intentions, the intention corresponding to the current moment T3 is an $i^{th}$ intention, where i is an integer greater than or equal to 0 and less than Y.

(T3−T1) represents duration from the T1 moment to the T3 moment, and (T3−T1)/T represents a quantity of times at which the Y intentions displayed on the UI are traversed from the T1 moment to the T3 moment. For example, with reference to FIG. 3, (T3−T1)/T represents a quantity of circles by which the dashboard pointer rotates. If the Y intentions displayed on the UI are traversed N times from the T1 moment to the T3 moment, $$\left(\frac{T3-T1}{T} - \left\lceil \frac{T3-T1}{T} \right\rceil\right) \times T$$

represents duration from a moment of traversing a first intention to the current moment in a process of traversing the Y intentions by the UI at the $(N+1)^{th}$ time. When $$\left(\frac{T3-T1}{T} - \left\lceil \frac{T3-T1}{T} \right\rceil\right) \times T$$

is greater than or equal to the sum of the candidate duration of the first i−1 intentions, and is less than or equal to the sum of the candidate duration of the first i intentions, it indicates that the $i^{th}$ intention is currently indicated by the UI. For example, with reference to FIG. 3, if (T3−T1)=25 s, it may be learned from the figure that the total sum T of the candidate duration is 2+3+2=7 s, 25/7 is rounded down to 3, and a result of 25/7−3 is multiplied by 7, and 4 is obtained. Because 4 is greater than 2 (greater than the candidate duration of the first intention), and is less than 5 (a sum of the candidate duration of the first two intentions), it may be determined that the intention corresponding to the current moment is the second intention, that is, the intention C.

It should be noted that, in the foregoing step (1), the sum T of the candidate duration of the Y intentions, and a proportion of each intention in T may be preset. In this way, step (1) may be: arranging, according to the preset sequence, the Y intentions displayed on the UI, and separately multiplying the total sum T of the candidate duration of the Y intentions by a time proportion coefficient of each intention in the Y intentions to obtain candidate duration of each intention in the Y intentions.

(5) Indicate, on the UI, that the intention corresponding to the current moment is the $i^{th}$ intention.

For example, with reference to FIG. 3, that the intention corresponding to the current moment is the intention C is indicated to a user by the dashboard pointer pointing to a region between A and C. Certainly, this is related to a rotation direction of the dashboard pointer, and a rotation direction of the dashboard pointer is clockwise herein. The dashboard pointer may rotate counterclockwise, and in this case, an arrangement sequence of intentions displayed on the UI should also be a counterclockwise sequence.

Figure 4:
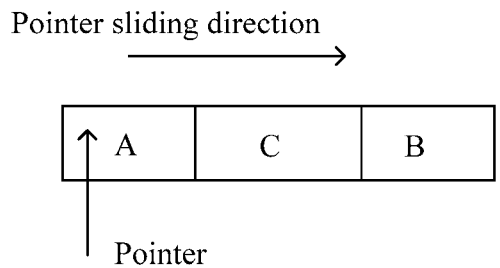
FIG. 4 is a schematic diagram of a sliding window UI according to Embodiment 1 of the present invention.

In addition, the UI may also be a sliding window. With reference to FIG. 4, there are three intentions A, C, and B in total displayed on the sliding window (A, C, and B are arranged according to the preset sequence), and if candidate duration of the intention A is 2 s, candidate duration of the intention B is 3 s, and candidate duration of the intention C is 2 s, the total sum T of the candidate duration is 2+3+2=7 s. With reference to FIG. 4, a time during which a pointer of the sliding window rotates from the intention A to the intention C is the candidate duration 2 s of the intention A; a time during which the pointer of the sliding window rotates from the intention C to the intention B is the candidate duration 3 s of the intention C; and a time during which the pointer of the sliding window rotates from the intention B to the intention A is the candidate duration 2 s of the intention B. Duration during which the pointer of the sliding window rotates from a leftmost side to a rightmost side is 2+3+2=7 s. Certainly, a sliding direction of the pointer of the sliding window is from left to right herein. If the sliding direction of the pointer of the sliding window is from right to left, an arrangement sequence of intentions displayed on the sliding window should also be from right to left. For example, with reference to FIG. 4, if M+X intentions displayed on the sliding window are traversed N times from the T1 moment to the T3 moment, $$\left(\frac{T3-T1}{T} - \left\lceil \frac{T3-T1}{T} \right\rceil\right) \times T$$

represents duration from a moment of traversing a first intention to the current moment in a process of traversing the M+X intentions by the UI at the $(N+1)^{th}$ time. When $$\left(\frac{T3-T1}{T} - \left\lceil \frac{T3-T1}{T} \right\rceil\right) \times T$$

is greater than or equal to the sum of the candidate duration of the first i−1 intentions, and is less than or equal to the sum of the candidate duration of the first i intentions, it indicates that the $i^{th}$ intention is currently indicated by the UI. For example, with reference to FIG. 4, if (T3−T1)=25 s, it may be learned from the figure that the total sum T of the candidate duration is 2+3+2=7 s, 25/7 is rounded down to 3, and a result of 25/7−3 is multiplied by 7, and 4 is obtained. Because 4 is greater than 2 (greater than the candidate duration of the first intention), and is less than 5 (a sum of the candidate duration of the first two intentions), it may be determined that the intention corresponding to the current moment is the second intention, that is, the intention C. That the intention corresponding to the current moment is the intention C is indicated to a user by the pointer of the sliding window pointing to a region between A and C.

It should be noted that some intentions in the L intentions may be displayed on the UI at a time, and then remaining intentions in the L intentions are displayed, and the Y intentions are cyclically displayed. For example, if the first communications terminal determines that the intention set includes eight intentions, and only five intentions can be displayed on the UI at a time, five intentions in the eight intentions may be first displayed, and three other intentions are implemented at a next moment.

103. The first communications terminal determines a to-be-executed intention according to a trigger operation of a user.

The trigger operation of the user specifically includes: an operation that causes a disconnection that is of the first communication bearer between the first communications terminal and the second communications terminal and that is detected by the first communications terminal; or a preset gesture operation that is performed on the screen of the first communications terminal and that is detected by the first communications terminal; or an operation that is performed on a preset button of the first communications terminal and that is detected by the first communications terminal; or input preset voice information detected by the first communications terminal.

In specific implementation, the to-be-executed intention may be an intention selected by the user from an intention list, or may be an intention determined by the first communications terminal according to a preset operation of the user. For example, if the user (a user of the first communications terminal) wants to select and execute the intention corresponding to the current moment, the user may instruct, by using the preset operation, the first communications terminal to establish a second communication bearer that matches the intention, so as to carry data, a picture, a voice, or the like corresponding to the intention.

In specific implementation, that the first communications terminal determines a to-be-executed intention according to a trigger operation of a user includes the following steps: (1) Record a T2 moment, where the T2 moment is a moment of detecting the trigger operation of the user by the first communications terminal.

The trigger operation performed on the first communications terminal by the user may be an operation that causes a disconnection of the first communication bearer between the first communications terminal and the second communications terminal, or may be touching the screen of the first communications terminal, or pressing a key on the first communications terminal, or pressing a combination of keys on the first communications terminal, or voice input, or an operation that causes a disconnection of the first communication bearer between the first communications terminal and the second communications terminal. For example, before step 101 in the present invention, an NFC connection between the first communications terminal and the second communications terminal may be established by setting NFC regions on respective terminals closer. When the user who uses the first communications terminal wants to execute the intention indicated by the current moment of the UI displayed on the first communications terminal, the first communications terminal may be far away from the second communications terminal. In this case, the NFC connection between the first communications terminal and the second communications terminal is disconnected, and the first communications terminal establishes the second communication bearer between the first communications terminal and the second communications terminal to execute the intention.

(2) When $$\left(\frac{T2-T1}{T} - \left\lceil \frac{T2-T1}{T} \right\rceil\right) \times T$$

is greater than or equal to a sum of candidate duration of first j−1 intentions, and is less than or equal to a sum of candidate duration of first j intentions, it is determined that a $j^{th}$ intention is the to-be-executed intention.

J is an integer greater than or equal to 0 and less than Y. This is intended to determine, according to the preset operation of the user, an intention indicated on the UI when the user performs the preset operation, that is, an intention selected and executed by the user.

A specific determining process is the same as a determining process of the foregoing step (3) "when $$\left(\frac{T3-T1}{T} - \left\lceil \frac{T3-T1}{T} \right\rceil\right) \times T$$

is greater than or equal to the sum of the candidate duration of the first i−1 intentions, and is less than or equal to the sum of the candidate duration of the first i intentions, the $i^{th}$ intention is currently executed", and only T3 is replaced with T2, and details are not described herein again.

104. The first communications terminal transmits data corresponding to the to-be-executed intention to the second communications terminal.

In specific implementation, the first communications terminal may transmit the data to the second communications terminal by using the second communication bearer. It should be noted that the first communication bearer and the second communication bearer each are any one in a communication bearer set, where the communication bearer set includes a near field communication NFC connection, a wireless fidelity Wi-Fi connection, a Bluetooth connection, or a Long Term Evolution direct communication LTE Direct connection.

According to the service processing method provided in the present invention, a first communications terminal determines L intentions (intention) and displays at least one of the L intentions; the first communications terminal determines a to-be-executed intention according to a trigger operation of a user; and the first communications terminal transmits data corresponding to the to-be-executed intention to the second communications terminal. An intention is displayed, so that the user freely selects a to-be-executed intention according to a will. Compared with the prior art in which an intention currently executed by a terminal is predetermined by an operating system or a currently running application, and a user cannot perform selection according to a will of the user, the service processing method provided in the present invention can display an intention, so that the user can freely select a to-be-executed intention.

Embodiment 2

Figure 5:
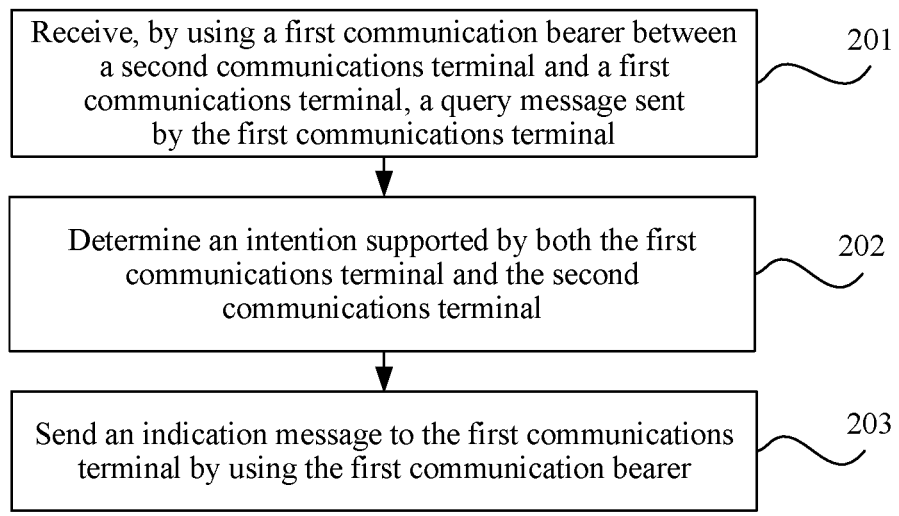
FIG. 5 is a schematic flowchart of a service processing method according to Embodiment 2 of the present invention.

This embodiment of the present invention provides a service processing method, and an execution body is a second communications terminal. As shown in FIG. 5, the method includes the following steps.

201. Receive, by using a first communication bearer between the second communications terminal and a first communications terminal, a query message sent by the first communications terminal.

The query message may specifically have the following two implementation manners.

Implementation manner 1: The first communications terminal obtains identification information of M first-type intentions supported by the application and identification information of N second-type intentions supported by the application, where the first-type intention is an intention supported by both the first communications terminal and the second communications terminal, the second-type intention is an intention that is supported by the first communications terminal and that requires determining of whether the second communications terminal supports, and both M and N are integers greater than or equal to zero.

In this case, the query message carries the identification information of the N second-type intentions, where the second-type intention is an intention that requires determining of the first communications terminal about whether the second communications terminal supports.

Implementation manner 2: The first communications terminal obtains identification information of each intention in the intention set, where the intention set includes each intention supported by the application.

In this case, the second query message carries the identification information of each intention in the intention set.

The first communication bearer may be an NFC connection. Certainly, the query message may also carry the identification information of the M first-type intentions that do not require determining of the first communications terminal about whether the second communications terminal supports. The query message may be CHS information. In specific implementation, the first communications terminal sends the CHS information to the second communications terminal according to a definition in the NFC Forum CHS 1.4 Draft, where the CHS information carries the identification information of the N second-type intentions.

202. Determine an intention supported by both the first communications terminal and the second communications terminal.

Specifically, the second communications terminal receives a first query message, parses the first query message, and obtains the identification information that is of the N second-type intentions (intention) and that is carried in the first query message. Intentions supported by the second communications terminal in the N second-type intentions may be determined by querying intentions registered by a system. That is, the intention supported by both the first communications terminal and the second communications terminal is determined. For example, if intention identifiers carried in the query message are A, B, C, and D, and an intention registration list in the query system of the second communications terminal includes only A, B, and C, it may be determined that the second communications terminal supports A, B, and C.

Alternatively, the second communications terminal receives the second query message, parses the second query message, and obtains identification information that is of intentions supported by the application and that is carried in the second query message. L intentions that are of the application and that are supported by both the second communications terminal and the first communications terminal may be determined by querying intentions registered by a system.

203. Send an indication message to the first communications terminal by using the first communication bearer.

In specific implementation, the indication message may have the following two implementation manners.

Implementation manner 1: A first indication message sent by the second communications terminal is received, where the first indication message carries identification information of X second-type intentions that are of the application and that are supported by both the first communications terminal and the second communications terminal, X is an integer greater than or equal to zero, and a sum of M and X is equal to L.

For example, if intention identifiers carried in the query message are A, B, C, and D, and the intention registration list in the query system of the second communications terminal includes only A, B, and C, it may be determined that the second communications terminal supports A, B, and C, and an indication message that carries A, B, and C is sent to the first communications terminal.

Implementation manner 2: A second indication message sent by the second communications terminal is received, where the second indication message carries identification information of the L intentions that are of the application and that are supported by both the first communications terminal and the second communications terminal.

It should be noted that the first communication bearer and the second communication bearer each are any one in a communication bearer set, where the communication bearer set includes a near field communication NFC connection, a wireless fidelity Wi-Fi connection, a Bluetooth connection, or a Long Term Evolution direct communication LTE Direct connection.

According to the service processing method provided in the present invention, a first communications terminal determines L intentions (intention) and displays at least one of the L intentions; the first communications terminal determines a to-be-executed intention according to a trigger operation of a user; and the first communications terminal transmits data corresponding to the to-be-executed intention to the second communications terminal. An intention is displayed, so that the user freely selects a to-be-executed intention according to a will. Compared with the prior art in which an intention currently executed by a terminal is predetermined by an operating system or a currently running application, and a user cannot perform selection according to a will of the user, the service processing method provided in the present invention can display an intention, so that the user can freely select a to-be-executed intention.

Embodiment 3

Figure 6:
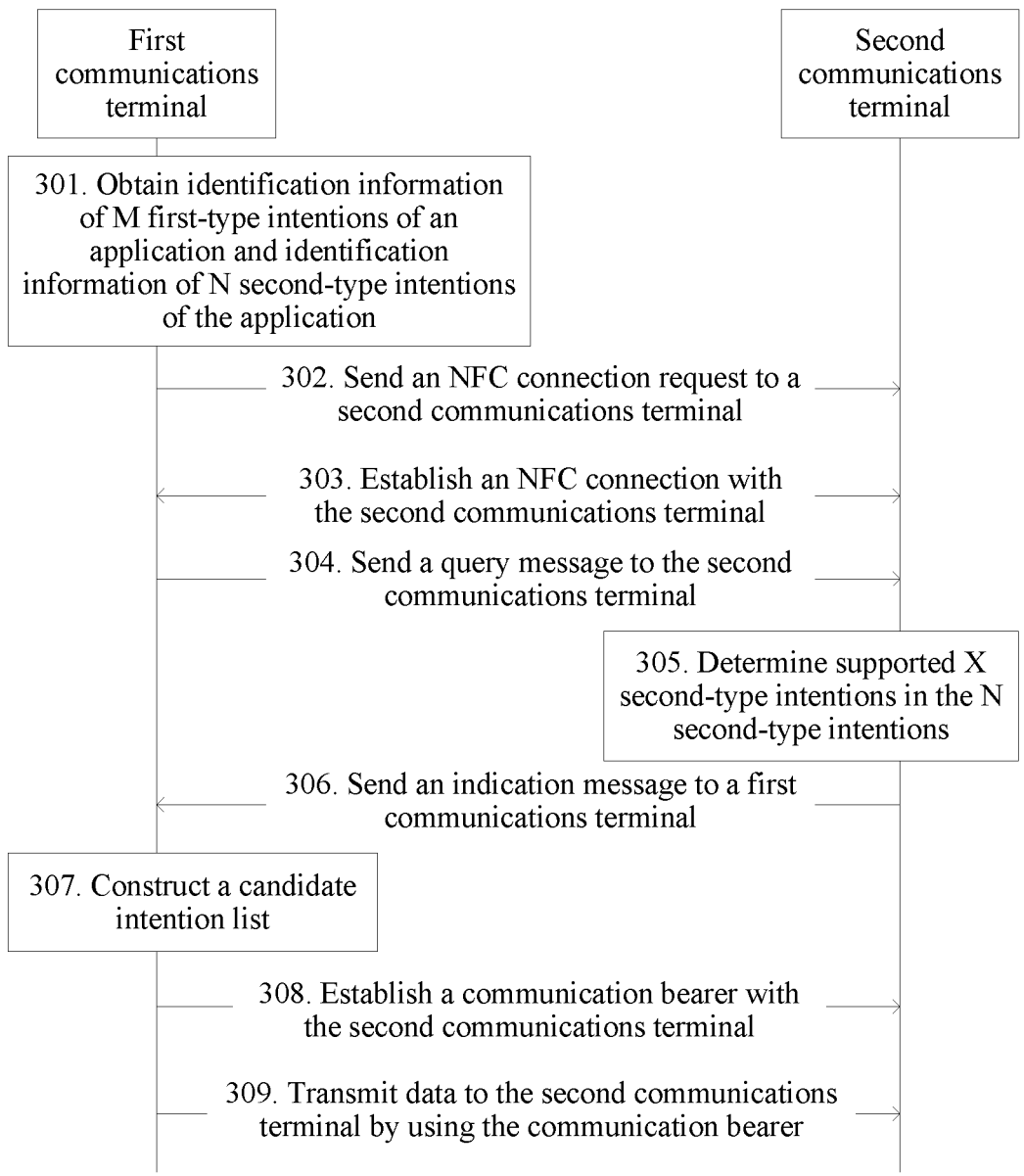
FIG. 6 is a schematic flowchart of a service processing method according to Embodiment 3 of the present invention.

This embodiment of the present invention provides a service processing method. As shown in FIG. 6, the method includes the following steps.

301. A first communications terminal obtains identification information of M first-type intentions of an application and identification information of N second-type intentions of the application.

A sum of M and X is equal to L; the first-type intention (intention) is an intention that does not require determining of the first communications terminal about whether there is support from a second communications terminal, and the second-type intention is an intention that requires determining of the first communications terminal about whether the second communications terminal supports.

Both the M first-type intentions and the N second-type intentions are intentions supported by the first communications terminal. The first communications terminal may determine, by using system registration information, intentions supported by the application, and determine whether the intentions need to be supported by a peer end. For example, a terminal generally supports picture receiving, and therefore the first communications terminal does not need to determine whether an intention of a picture transmission type is supported by the second communications terminal. For an intention of an online game type, the first communications terminal needs to transfer an account or configuration information of a current application to the second communications terminal, and there is a need to determine whether an intention of this type is supported by a peer end. For example, if the second communications terminal does not support the game (for example, a related application is not downloaded), the intention cannot be executed. Therefore, the first communications terminal needs to determine whether an intention of this type is supported by the second communications terminal.

302. The first communications terminal sends an NFC connection request to a second communications terminal.

303. The first communications terminal establishes an NFC connection with the second communications terminal.

In specific implementation, NFC antenna regions of the first communications terminal and the second communications terminal may be set closer, and the NFC connection between the first communications terminal and the second communications terminal is further established.

304. The first communications terminal sends a query message to the second communications terminal.

The query message carries the identification information of the N second-type intentions. The query message may be CHS information. Certainly, the query message may further carry the identification information of the M first-type intentions. This is not limited herein.

In specific implementation, the first communications terminal sends the query message to the second communications terminal by using the NFC connection with the second communications terminal.

305. The second communications terminal determines supported X second-type intentions in the N second-type intentions.

The second communications terminal receives the CHS information, parses the CHS information, and obtains the identification information that is of the N second-type intentions and that is carried in the CHS information. Intentions supported by the second communications terminal in the N second-type intentions may be determined by querying intentions registered by a system. For example, if intention identifiers carried in the query message are A, B, C, and D, and an intention registration list in the query system of the second communications terminal includes only A, B, and C, it may be determined that the second communications terminal supports A, B, and C.

306. The second communications terminal sends an indication message to the first communications terminal.

The indication message is used to indicate the L intentions supported by both the first communications terminal and the second communications terminal, that is, the X second-type intentions supported by the second communications terminal in the N second-type intentions, where a sum of M and N is equal to L.

In specific implementation, the second communications terminal sends the indication message to the second communications terminal by using the NFC connection with the first communications terminal.

The indication message carries identification information of the X second-type intentions supported by the second communications terminal in the N second-type intentions. The first communications terminal parses the indication information, obtains the identification information that is of the intentions and that is carried in the indication information, and may determine the intentions supported by the second communications terminal. For example, if intention identifiers carried in the query message are A, B, C, and D, and the intention registration list in the query system of the second communications terminal includes only A, B, and C, it may be determined that the second communications terminal supports A, B, and C, and an indication message that carries A, B, and C is sent to the first communications terminal.

307. The first communications terminal constructs a candidate intention list.

The candidate intention (intention) list is also a UI displayed on a terminal screen. The candidate intention list includes the M first-type intentions and the X second-type intentions, that is, the L intentions supported by both the first communications terminal and the second communications terminal. Alternatively, the candidate intention list includes Y intentions in the L intentions.

For example, if the intentions that are supported by the application and that are obtained in step 301 include an intention E, an intention D, and an intention F, where there is a need to determine whether the intention F is supported by a peer end, and if the first communications terminal determines, according to the indication information, that the second communications terminal does not support the intention F, the candidate intention list includes the intention E and the intention D; or if the first communications terminal determines, according to the indication information, that the second communications terminal supports the intention F, the candidate intention list includes the intention E, the intention D, and the intention F.

308. The first communications terminal establishes a communication bearer between the first communications terminal and the second communications terminal.

The communication bearer is a bearer that matches an intention selected by a user. The communication bearer is any one in a communication bearer set, where the communication bearer set includes a near field communication NFC connection, a wireless fidelity Wi-Fi connection, a Bluetooth connection, or a Long Term Evolution direct communication LTE Direct connection.

309. The first communications terminal transmits data to the second communications terminal by using the communication bearer.

The transmitted data is data corresponding to the intention selected by the user. For example, if the intention selected by the user is "sending a current web page link to a peer end", the first communications terminal sends a current URL (Uniform Resource Locator, uniform resource locator) to the second communications terminal.

According to the service processing method provided in the present invention, identification information of M first-type intentions of an application and identification information of N second-type intentions of the application are obtained; a query message is sent to the second communications terminal by using a first communication bearer between the first communications terminal and the second communications terminal; and an indication message sent by the second communications terminal is received, where the indication message is used to indicate X second-type intentions supported by the second communications terminal. A user interface UI is displayed on a screen, and the M first-type intentions and the X second-types intentions are displayed on the UI, so that a user freely selects a to-be-executed intention according to a will. Compared with the prior art in which an intention currently executed by a terminal is predetermined by an operating system or a currently running application, and a user cannot perform selection according to a will of the user, the method provided in the present invention can display an intention, so that the user can freely select a to-be-executed intention.

Embodiment 4

Figure 7:
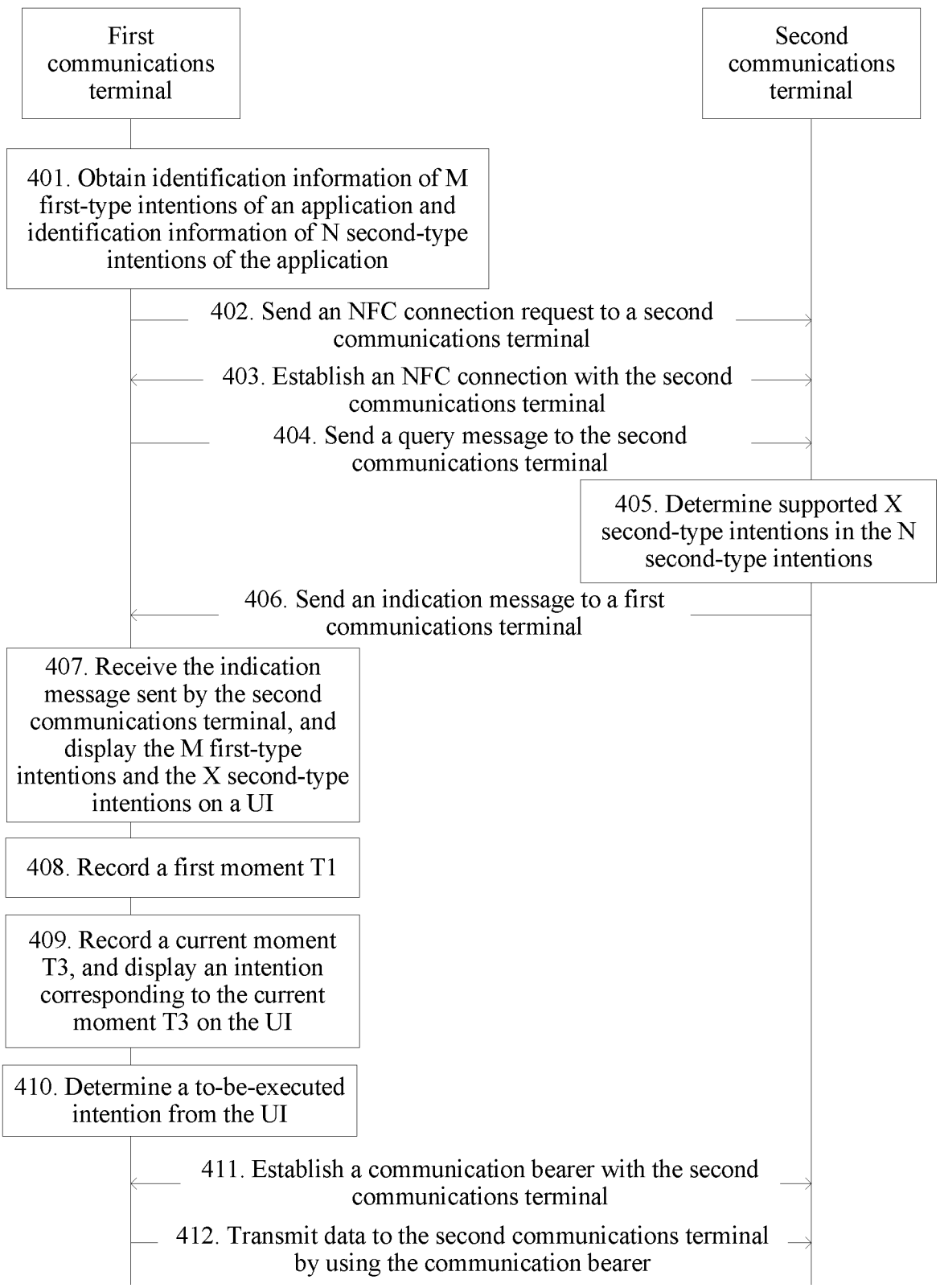
FIG. 7 is a schematic flowchart of a service processing method according to Embodiment 4 of the present invention.

This embodiment of the present invention provides a service processing method. As shown in FIG. 7, the method includes the following steps.

401. A first communications terminal obtains identification information of M first-type intentions of an application and identification information of N second-type intentions of the application.

The first-type intention (intention) is an intention that does not require determining of the first communications terminal about whether there is support from a second communications terminal, and the second-type intention is an intention that requires determining of the first communications terminal about whether the second communications terminal supports.

Both the M first-type intentions and the N second-type intentions are intentions supported by the first communications terminal. The first communications terminal may determine, by using system registration information, intentions supported by the application, and determine whether the intentions need to be supported by a peer end. For example, a terminal generally supports picture receiving, and therefore the first communications terminal does not need to determine whether an intention of a picture transmission type is supported by the second communications terminal. For an intention of an online game type, the first communications terminal needs to transfer an account or configuration information of a current application to the second communications terminal, and there is a need to determine whether an intention of this type is supported by a peer end. For example, if the second communications terminal does not support the game (for example, a related application is not downloaded), the intention cannot be executed. Therefore, the first communications terminal needs to determine whether an intention of this type is supported by the second communications terminal.

402. The first communications terminal sends an NFC connection request to a second communications terminal.

403. The first communications terminal establishes an NFC connection with the second communications terminal.

In specific implementation, NFC antenna regions of the first communications terminal and the second communications terminal may be set closer, and the NFC connection between the first communications terminal and the second communications terminal is further established.

404. The first communications terminal sends a query message to the second communications terminal.

The query message carries the identification information of the N second-type intentions. The query message may be CHS information. Certainly, the query message may further carry the identification information of the M first-type intentions. This is not limited herein.

In specific implementation, the first communications terminal sends the query message to the second communications terminal by using the NFC connection with the second communications terminal.

405. The second communications terminal determines supported X second-type intentions in the N second-type intentions.

The second communications terminal receives the CHS information, parses the CHS information, and obtains the identification information that is of the N second-type intentions and that is carried in the CHS information. Intentions supported by the second communications terminal in the N second-type intentions may be determined by querying intentions registered by a system. For example, if intention identifiers carried in the query message are A, B, C, and D, and an intention registration list in the query system of the second communications terminal includes only A, B, and C, it may be determined that the second communications terminal supports A, B, and C.

406. The second communications terminal sends an indication message to the first communications terminal.

The indication message is used to indicate the L intentions supported by both the first communications terminal and the second communications terminal, that is, the X second-type intentions supported by the second communications terminal in the N second-type intentions, where a sum of M and N is equal to L.

In specific implementation, the second communications terminal sends the indication message to the second communications terminal by using the NFC connection with the first communications terminal.

The indication message carries identification information of the X second-type intentions supported by the second communications terminal in the N second-type intentions. The first communications terminal parses the indication information, obtains the identification information that is of the intentions and that is carried in the indication information, and may determine the intentions supported by the second communications terminal. For example, if intention identifiers carried in the query message are A, B, C, and D, and the intention registration list in the query system of the second communications terminal includes only A, B, and C, it may be determined that the second communications terminal supports A, B, and C, and an indication message that carries A, B, and C is sent to the first communications terminal.

407. The first communications terminal receives the indication message sent by the second communications terminal, and displays at least one of the L intentions on a UI.

In specific implementation, the first communications terminal parses the indication information sent by the second communications terminal, and determines the L intentions supported by both the first communications terminal and the second communications terminal. For example, if the intentions that are supported by the application and that are obtained in step 401 include an intention E, an intention D, and an intention F, where there is a need to determine whether the intention F is supported by a peer end, and if the first communications terminal determines, according to the indication information, that the second communications terminal does not support the intention F, the intention E and the intention D are displayed on the UI; or if the first communications terminal determines, according to the indication information, that the second communications terminal supports the intention F, the intention E, the intention D, and the intention F are displayed on the UI.

In specific implementation, the first communications terminal displays Y intentions on the UI, and the terminal sequentially and cyclically indicates the Y intentions on the UI according to a preset sequence, where duration between a moment of indicating a current intention and a moment of indicating a next intention of the current intention is candidate duration of the current intention, and $1 \leq Y \leq L$.

The first communications terminal arranges, according to the preset sequence, the Y intentions displayed on the UI. The preset sequence may be a descending sequence of candidate duration of the intentions, or an ascending sequence of candidate duration of the intentions, or a sequence that is set according to other priorities of the intentions, or a randomly generated sequence. This is not limited herein. The candidate duration is preset by a system, and candidate duration of an intention represents duration from the intention to a next intention on the dynamic UI. On a dashboard UI, after the intentions are arranged according to the preset sequence, the intentions may be displayed counterclockwise on the dashboard UI, or may be displayed clockwise on the dashboard UI.

408. The first communications terminal records a T1 moment.

The T1 moment is a moment of receiving the indication message (the indication message in this embodiment) by a DH of the first communications terminal, or a moment of displaying the Y intentions on the UI by the first communications terminal, or any one of moments from a moment of establishing the first communication bearer between the first communications terminal and the second communications terminal to a moment of displaying the Y intentions on the UI.

409. The first communications terminal records a current moment T3, and displays, on the UI, an intention corresponding to the current moment T3.

When $$\left(\frac{T3-T1}{T} - \left\lceil\frac{T3-T1}{T}\right\rceil\right) \times T$$

is greater than or equal to a sum of candidate duration of first i−1 intentions, and is less than or equal to a sum of candidate duration of first i intentions, an $i^{th}$ intention is currently executed, where Y is an integer greater than or equal to 0 and less than Y, and $\lceil\ \rceil$ represents rounding down.

(T3−T1) represents duration from the T1 moment to the T3 moment, and (T3−T1)/T represents a quantity of times at which M+X intentions displayed on the UI are traversed from the T1 moment to the T3 moment. For example, with reference to FIG. 3, if the Y intentions displayed on the UI are traversed N times from the T1 moment to the T3 moment, $$\left(\frac{T3-T1}{T} - \left\lceil\frac{T3-T1}{T}\right\rceil\right) \times T$$

represents duration from a moment of traversing a first intention to the current moment in a process of traversing the Y intentions by the UI at the (N+1) h time. When $$\left(\frac{T3-T1}{T} - \left\lceil\frac{T3-T1}{T}\right\rceil\right) \times T$$

is greater than or equal to the sum of the candidate duration of the first i−1 intentions, and is less than or equal to the sum of the candidate duration of the first i intentions, it indicates that the $i^{th}$ intention is currently indicated by the UI. For example, with reference to FIG. 3, if (T3−T1)=25 s, it may be learned from the figure that the total sum T of the candidate duration is 2+3+2=7 s, 25/7 is rounded down to 3, and a result of 25/7−3 is multiplied by 7, and 4 is obtained. Because 4 is greater than 2 (greater than the candidate duration of the first intention), and is less than 5 (a sum of the candidate duration of the first two intentions), it may be determined that the intention corresponding to the current moment is the second intention, that is, the intention C.

410. The first communications terminal determines a to-be-executed intention according to a trigger operation of a user.

The trigger operation of the user specifically includes: an operation that causes a disconnection that is of the first communication bearer between the first communications terminal and the second communications terminal and that is detected by the first communications terminal; or a preset gesture operation that is performed on the screen of the first communications terminal and that is detected by the first communications terminal; or an operation that is performed on a preset button of the first communications terminal and that is detected by the first communications terminal; or input preset voice information detected by the first communications terminal.

In specific implementation, the first communications terminal records a T2 moment, and determines the to-be-executed intention according to the T2 moment. The T2 moment is a moment of the disconnection of the first communication bearer between the first communications terminal and the second communications terminal, or a moment of detecting a first preset operation by the first communications terminal.

That the first communications terminal detects a first preset operation may be: 1. It is detected that a preset gesture operation is performed on the screen of the first communications terminal by the user, for example, the screen of the first communications terminal is touched; or 2. It is detected that an operation is performed on the preset button of the first communications terminal, for example, a screen locking key on the first communications terminal is pressed, or a combination of keys on the first communications terminal is pressed; or 3. Input preset voice information is detected. Because the NFC connection is established between the first communications terminal and the second communications terminal, and when the user who uses the first communications terminal wants to execute the intention indicated by the current moment of the UI displayed on the first communications terminal, the first communications terminal may be far away from the second communications terminal. In this case, the NFC connection between the first communications terminal and the second communications terminal is disconnected, and the first communications terminal establishes a second communication bearer between the first communications terminal and the second communications terminal to execute the intention.

Specifically, when $$\left(\frac{T2-T1}{T} - \left\lceil\frac{T2-T1}{T}\right\rceil\right) \times T$$

is greater than or equal to a sum of candidate duration of first j−1 intentions, and is less than a sum of candidate duration of first j intentions, a communication bearer that matches the $j^{th}$ intention is established. The communication bearer is any one in a communication bearer set, where the communication bearer set includes a near field communication NFC connection, a wireless fidelity Wi-Fi connection, a Bluetooth connection, or a Long Term Evolution direct communication LTE Direct connection.

411. The first communications terminal establishes a communication bearer between the first communications terminal and the second communications terminal, and transmits data to the second communications terminal by using the communication bearer.

The communication bearer is a bearer that matches the to-be-executed intention, and the intention selected by the user is the intention corresponding to the T3 moment. The transmitted data is data corresponding to the intention selected by the user. For example, if the intention selected by the user is "sending a current web page link to a peer end", the first communications terminal sends a current URL (Uniform Resource Locator, uniform resource locator) to the second communications terminal.

According to the service processing method provided in the present invention, a first communications terminal determines L intentions (intention) and displays at least one of the L intentions; the first communications terminal determines a to-be-executed intention according to a trigger operation of a user; and the first communications terminal transmits data corresponding to the to-be-executed intention to the second communications terminal. An intention is displayed, so that the user freely selects a to-be-executed intention according to a will. Compared with the prior art in which an intention currently executed by a terminal is predetermined by an operating system or a currently running application, and a user cannot perform selection according to a will of the user, the service processing method provided in the present invention can display an intention, so that the user can freely select a to-be-executed intention.

Embodiment 5

Figure 8:
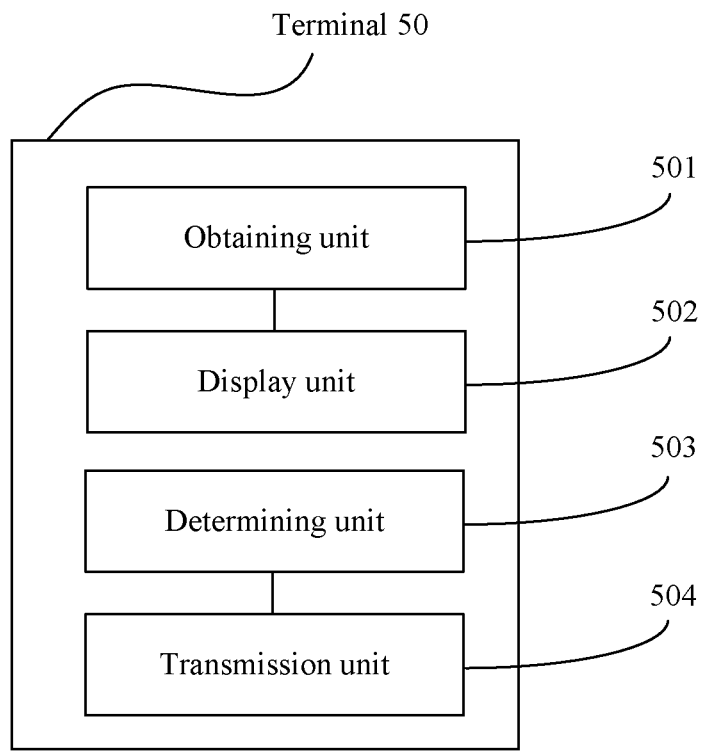
FIG. 8 is a structural block diagram of a terminal according to Embodiment 5 of the present invention.

This embodiment of the present invention provides a terminal 50. As shown in FIG. 8, the terminal 50 includes an obtaining unit 501, a display unit 502, a determining unit 503, and a transmission unit 504.

The obtaining unit 501 is configured to determine L intentions (intention), where both the first communications terminal and a second communications terminal support an application, the application supports the L intentions, and L is an integer greater than or equal to 1.

The display unit 502 is configured to display at least one of the L intentions. In specific implementation, the at least one of the L intentions may be displayed on a UI.

The determining unit 503 is configured to determine a to-be-executed intention according to a trigger operation of a user.

The transmission unit 504 is configured to transmit data corresponding to the to-be-executed intention to the second communications terminal.

The obtaining unit 501 further includes a sending subunit and a receiving subunit.

The obtaining unit 501 is specifically configured to obtain identification information of M first-type intentions supported by the application and identification information of N second-type intentions supported by the application, where the first-type intention is an intention supported by both the first communications terminal and the second communications terminal, the second-type intention is an intention that is supported by the first communications terminal and that requires determining of whether the second communications terminal supports, and both M and N are integers greater than or equal to zero.

The sending subunit is configured to send a first query message to the second communications terminal by using a first communication bearer between the first communications terminal and the second terminal, where the first query message carries the identification information of the N second-type intentions.

The first communication bearer may be an NFC connection. Certainly, the query message may also carry the identification information of the M first-type intentions that do not require determining of the first communications terminal about whether the second communications terminal supports. The query message may be CHS information. In specific implementation, the first communications terminal sends the CHS information to the second communications terminal according to a definition in the NFC Forum CHS 1.4 Draft, where the CHS information carries the identification information of the N second-type intentions.

The receiving subunit is configured to receive, by using the first communication bearer, a first indication message sent by the second communications terminal, where the first indication message carries identification information of X second-type intentions that are of the application and that are supported by both the first communications terminal and the second communications terminal, X is an integer greater than or equal to zero, and a sum of M and X is equal to L.

For example, if intention identifiers carried in the query message are A, B, C, and D, and an intention registration list in a query system of the second communications terminal includes only A, B, and C, it may be determined that the second communications terminal supports A, B, and C, and an indication message that carries A, B, and C is sent to the first communications terminal.

The obtaining unit 501 is configured to obtain identification information of each intention in the intention set, where the intention set includes each intention supported by the application.

The sending subunit is configured to send a second query message to the second communications terminal by using a first communication bearer between the first communications terminal and the second communications terminal, where the second query message carries the identification information of each intention in the intention set.

The receiving subunit is configured to receive, by using the first communication bearer, a second indication message sent by the second communications terminal, where the second indication message carries identification information of the L intentions that are of the application and that are supported by both the first communications terminal and the second communications terminal.

The display unit 502 is specifically configured to display Y intentions, and sequentially and cyclically indicate the Y intentions according to a preset sequence, where duration between a moment of indicating a current intention and a moment of indicating a next intention of the current intention is candidate duration of the current intention, and 1≤Y≤L. In specific implementation, the Y intentions may be displayed on the UI, and the Y intentions are sequentially and cyclically indicated according to the preset sequence.

The determining unit 503 is specifically configured to: record a T1 moment, where the T1 moment is a moment of receiving the first indication message or the second indication message by the first communications terminal, or a moment of displaying the Y intentions by the first communications terminal, or any one of moments from a moment of establishing the first communication bearer between the first communications terminal and the second communications terminal to a moment of displaying the Y intentions;

record a T2 moment, where the T2 moment is a moment of detecting the trigger operation of the user by a detection unit of the first communications terminal; and when $$\left(\frac{T2-T1}{T} - \left\lceil \frac{T2-T1}{T} \right\rceil\right) \times T$$

is greater than or equal to a sum of candidate duration of first j−1 intentions, and is less than or equal to a sum of candidate duration of first j intentions, determine that a $j^{th}$ intention is the to-be-executed intention; where T is a total sum of candidate duration of the Y intentions, j is an integer greater than or equal to 0 and less than Y, and ⌊ ⌋ represents rounding down.

With reference to the fourth possible implementation manner of the second aspect, in a fifth possible implementation manner of the second aspect, the determining unit 503 is further configured to: before the T1 moment is recorded, determine candidate duration of each intention in the Y intentions, and add up the candidate duration of each intention in the Y intentions to obtain T; or the determining unit 503 is configured to determine T, and separately multiply T by a time proportion coefficient of each intention in the L intentions to obtain candidate duration of each intention in the L intentions.

The first communications terminal further includes the detection unit, and that a detection unit detects the trigger operation of the user includes: detecting that the first communication bearer between the first communications terminal and the second communications terminal is disconnected; or detecting that a preset gesture operation is performed on a screen of the first communications terminal; or detecting that an operation is performed on a preset button of the first communications terminal; or detecting input preset voice information.

According to the terminal provided in the present invention, a first communications terminal determines L intentions (intention) and displays at least one of the L intentions; the first communications terminal determines a to-be-executed intention according to a trigger operation of a user; and the first communications terminal transmits data corresponding to the to-be-executed intention to the second communications terminal. An intention is displayed, so that the user freely selects a to-be-executed intention according to a will. Compared with the prior art in which an intention currently executed by a terminal is predetermined by an operating system or a currently running application, and a user cannot perform selection according to a will of the user, the terminal provided in the present invention can display an intention, so that the user can freely select a to-be-executed intention.

Embodiment 6

Figure 9:
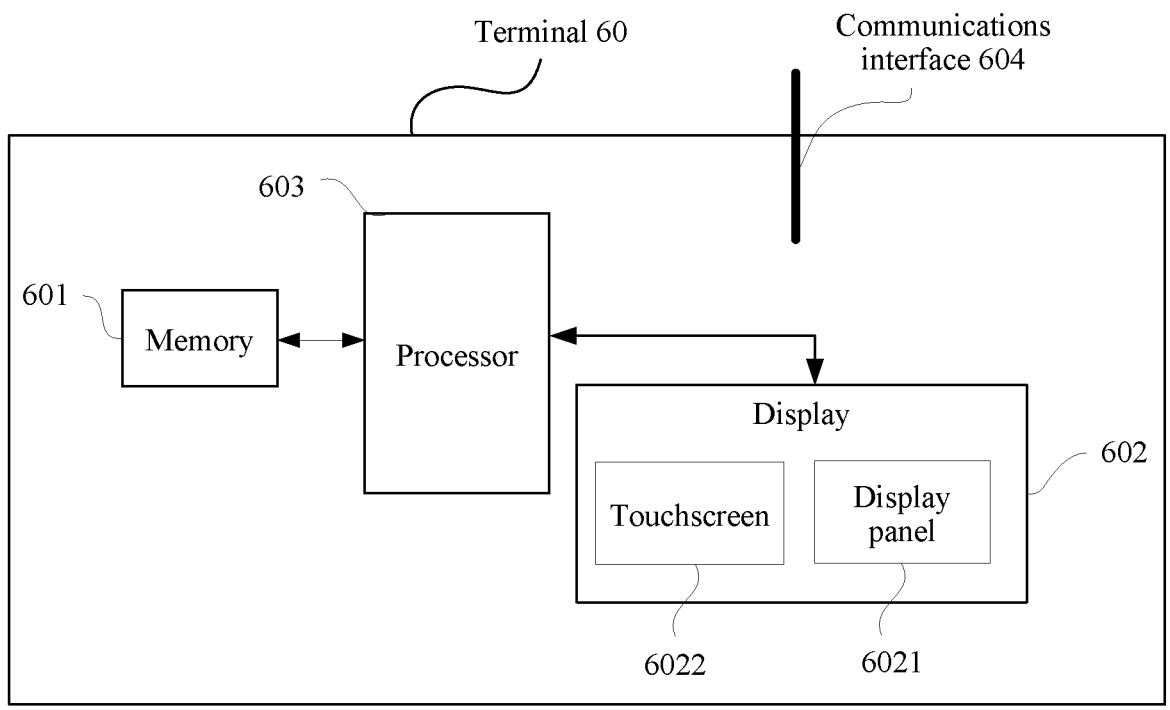
FIG. 9 is a structural block diagram of a terminal according to Embodiment 6 of the present invention.

This embodiment of the present invention further provides a terminal 60. As shown in FIG. 9, FIG. 9 is a schematic structural diagram of a terminal according to an embodiment of the present invention. The terminal provided in this embodiment of the present invention may be configured to implement the methods implemented in the embodiments of the present invention shown in FIG. 1 to FIG. 7. For ease of description, only a part related to this embodiment of the present invention is shown. For specific technical details that are not disclosed, refer to the embodiments of the present invention shown in FIG. 1 to FIG. 7.

The terminal may be a terminal device such as a mobile phone, a tablet computer, a notebook computer, a UMPC (Ultra-mobile Personal Computer, ultra-mobile personal computer), a netbook, or a PDA (Personal Digital Assistant, personal digital assistant).

As shown in FIG. 9, the terminal 40 includes a memory 401, a display unit 402, and a processor 403. Persons skilled in the art may understand that a structure of a mobile phone shown in FIG. 9 does not constitute any limitation on the mobile phone. The mobile phone may include parts more or fewer than those shown in the figure, or combine some parts, or have a different part arrangement.

The following describes each integral part of the terminal 60 in detail with reference to FIG. 9.

The memory 601 may be configured to store a software program and a module, and the processor 603 runs the software program and the module that are stored in the memory 601, so as to execute various function applications of the terminal 60 and data processing. The memory 601 may mainly include a program storage area and a data storage area. The program storage area may store an operating system, an application program required by at least one function (such as a sound play function or an image play function), and the like; and the data storage area may store data (such as audio data, image data, or a phone book) created according to use of the terminal 60, and the like. In addition, the memory 601 may include a high-speed random access memory, and may further include a nonvolatile memory such as at least one magnetic disk storage component, a flash memory component, or another volatile solid-state storage component.

A display 602 may be configured to display information input by a user or information provided for the user, and various menus of the terminal 60. The display 602 may include a display panel 6021. Optionally, the display panel 6021 may be configured in a form such as an LCD (Liquid Crystal Display, liquid crystal display) or an OLED (Organic Light-Emitting Diode, organic light-emitting diode). Further, a touchscreen 6022 may cover the display panel 6021. When the touchscreen 6022 detects a touch operation on or near the touchscreen 6022, the touch operation is transferred to the processor 603 to determine a type of a touch event, and then the processor 603 provides corresponding visual output on the display panel 6021 according to the type of the touch event. In FIG. 9, though the touchscreen 6022 and the display panel 6021 are used as two independent parts to implement input and input functions of the terminal, in some embodiments, the touchscreen 6022 and the display panel 6021 may be integrated to implement the input and output functions of the terminal 60.

The processor 603 is a control center of the terminal 60, is connected to various parts of the entire mobile phone by using various interfaces and lines, and executes various functions of the terminal 60 and data processing by running or executing a software program and/or a module stored in the memory 601 and by invoking data stored in the memory 601, so as to perform overall monitoring on the mobile phone. Optionally, the processor 603 may include one or more processing units. Preferably, an application processor and a modem processor may be integrated into the processor 603, where the application processor mainly processes an operating system, a user interface, an application program, and the like; and the modem processor mainly processes wireless communication. It may be understood that the foregoing modem processor may not be integrated into the processor 603.

The processor 603 is configured to determine L intentions (intention), where both the first communications terminal and a second communications terminal support an application, the application supports the L intentions, and L is an integer greater than or equal to 1.

The display 602 is configured to display at least one of the L intentions. In specific implementation, the at least one of the L intentions may be displayed on a UI.

The processor 603 is further configured to determine a to-be-executed intention according to a trigger operation of a user.

The processor 603 is further configured to transmit, by using a communications interface 604, data corresponding to the to-be-executed intention to the second communications terminal.

The determining L intentions specifically includes:

(1) obtaining identification information of M first-type intentions supported by the application and identification information of N second-type intentions supported by the application, where the first-type intention is an intention supported by both the first communications terminal and the second communications terminal, the second-type intention is an intention that is supported by the first communications terminal and that requires determining of whether the second communications terminal supports, and both M and N are integers greater than or equal to zero;

(2) sending a first query message to the second communications terminal by using a first communication bearer between the first communications terminal and the second terminal, where the first query message carries the identification information of the N second-type intentions; and (3) receiving, by using the first communication bearer, a first indication message sent by the second communications terminal, where the first indication message carries identification information of X second-type intentions that are of the application and that are supported by both the first communications terminal and the second communications terminal, X is an integer greater than or equal to zero, and a sum of M and X is equal to L.

The determining L intentions specifically includes: (1) obtaining identification information of an intention supported by the application;

(2) sending a second query message to the second communications terminal by using a first communication bearer between the first communications terminal and the second communications terminal, where the second query message carries the identification information of the intention supported by the application; and (3) receiving, by using the first communication bearer, a second indication message sent by the second communications terminal, where the second indication message carries identification information of the L intentions that are of the application and that are supported by both the first communications terminal and the second communications terminal.

The displaying at least one of the L intentions specifically includes: displaying Y intentions, and sequentially and cyclically indicating the Y intentions according to a preset sequence, where duration between a moment of indicating a current intention and a moment of indicating a next intention of the current intention is candidate duration of the current intention, and $1 \leq Y \leq L$.

The determining a to-be-executed intention according to a trigger operation of a user specifically includes: (1) recording a T1 moment, where the T1 moment is a moment of receiving the first indication message or the second indication message by the first communications terminal, or a moment of displaying the Y intentions by the first communications terminal, or any one of moments from a moment of establishing the first communication bearer between the first communications terminal and the second communications terminal to a moment of displaying the Y intentions; and (2) recording a T2 moment, where the T2 moment is a moment of detecting the trigger operation of the user by the processor 603 of the first communications terminal.

When $$\left( \frac{T2-T1}{T} - \left\lceil \frac{T2-T1}{T} \right\rceil \right) \times T$$

is greater than or equal to a sum of candidate duration of first $j-1$ intentions, and is less than or equal to a sum of candidate duration of first j intentions, it is determined that a $j^{th}$ intention is the to-be-executed intention.

T is a total sum of candidate duration of the Y intentions, j is an integer greater than or equal to 0 and less than Y, and $\lceil \ \rceil$ represents rounding down.

The processor 603 is further configured to: before the T1 moment is recorded, determine candidate duration of each intention in the Y intentions, and add up the candidate duration of each intention in the Y intentions to obtain T; or the processor 603 is further configured to determine T, and separately multiply T by a time proportion coefficient of each intention in the L intentions to obtain candidate duration of each intention in the L intentions.

The detecting the trigger operation of the user specifically includes: detecting that the first communication bearer between the first communications terminal and the second communications terminal is disconnected; or detecting that a preset gesture operation is performed on a screen of the first communications terminal; or detecting that an operation is performed on a preset button of the first communications terminal; or detecting input preset voice information.

According to the terminal provided in the present invention, a first communications terminal determines L intentions (intention) and displays at least one of the L intentions; the first communications terminal determines a to-be-executed intention according to a trigger operation of a user; and the first communications terminal transmits data corresponding to the to-be-executed intention to the second communications terminal. An intention is displayed, so that the user freely selects a to-be-executed intention according to a will. Compared with the prior art in which an intention currently executed by a terminal is predetermined by an operating system or a currently running application, and a user cannot perform selection according to a will of the user, the terminal provided in the present invention can display an intention, so that the user can freely select a to-be-executed intention.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A service processing method, wherein the method comprises:
    obtaining, by a first communications terminal, identification information of M first-type intentions supported by a first application of a first terminal and identification information of N second-type intentions supported by the first application, wherein the first application and a second application of a second communications terminal are a same type of application, each first-type intention is supported by both the first application of the first communications terminal and the second application of the second communications terminal, each second-type intention is supported by the first application of the first communications terminal and requires a determination of whether the respective second-type intention is supported by the second application of the second communications terminal, and both M and N are integers greater than or equal to one;
    sending, by the first communications terminal, a first query message to the second communications terminal using a first communication bearer between the first communications terminal and the second communications terminal, wherein the first query message carries the identification information of the N second-type intentions;
    receiving, by the first communications terminal using the first communication bearer, a first indication message sent by the second communications terminal, wherein the first indication message carries identification information of X second-type intentions that are supported by the first application and the second application, X is an integer greater than or equal to one;
    displaying, by the first communications terminal, a plurality of intentions, wherein the plurality of intentions comprises intentions of the M first-type intentions or intentions of the X second-type intentions, each of the plurality of intentions corresponds to a different performable action corresponding to the first application, a quantity of intentions of the plurality of intentions is L, and L is an integer greater than or equal to two;
    determining, by the first communications terminal, a to-be-executed intention of the plurality of intentions according to a trigger operation of a user, wherein determining the to-be-executed intention comprises:
        recording a T1 moment, wherein the T1 moment is a moment of receiving the first indication message or a second indication message by the first communications terminal, or a moment of displaying Y intentions of the plurality of intentions by the first communications terminal, or any one of moments from a moment of establishing the first communication bearer between the first communications terminal and the second communications terminal to a moment of displaying the Y intentions;
        recording a T2 moment, wherein the T2 moment is a moment of detecting the trigger operation of the user by the first communications terminal; and
        when $$\left(\frac{T2-T1}{T} - \left\lceil\frac{T2-T1}{T}\right\rceil\right) \times T$$

is greater than or equal to a sum of candidate durations of first j−1 intentions, and is less than or equal to a sum of candidate durations of first j intentions, determining that a $j^{th}$ intention is the to-be-executed intention; and
        wherein T is a total sum of candidate duration of the Y intentions, j is an integer greater than or equal to 1 and less than Y, Y is an integer greater than 1, and ⌈ ⌉ represents a rounding down operation; and
    transmitting, by the first communications terminal, data corresponding to the to-be-executed intention to the second communications terminal.

2. The method according to claim 1, wherein displaying, by the first communications terminal, the plurality of intentions comprises: displaying, by the first communications terminal, the Y intentions, and sequentially and cyclically indicating, by the first communications terminal, the Y intentions according to a preset sequence, wherein a duration between a moment of indicating a current intention and a moment of indicating a next intention of the current intention is a candidate duration of the current intention, and 1≤Y≤L.

3. The method according to claim 2, wherein before recording the T1 moment, the method further comprises:
    determining, by the first communications terminal, a candidate duration of each intention in the Y intentions, and adding up the candidate duration of each intention in the Y intentions to obtain T; or
    determining T, and separately multiplying T by a time proportion coefficient of each intention in the L intentions to obtain a candidate duration of each intention in the L intentions.

4. The method according to claim 1, wherein detecting, by the first communications terminal, the trigger operation of the user comprises:
    detecting, by the first communications terminal, that the first communication bearer between the first communications terminal and the second communications terminal is disconnected; or detecting, by the first communications terminal, that a preset gesture operation is performed on a screen of the first communications terminal; or detecting, by the first communications terminal, that an operation is performed on a preset button of the first communications terminal; or detecting, by the first communications terminal, input preset voice information.

5. The method according to claim 1, wherein the M first-type intentions comprises:
transferring a current picture;
transferring a current screenshot;
transferring a current uniform resource locator (URL);
transferring a download address of a current application;
transferring an installation file of a current application; or
transferring an account or configuration information of a current application.

6. The method according to claim 1, wherein the first communication bearer is a bearer of a near field communication connection.

7. A terminal, comprising:
a display; and
a processor, configured to:
obtain identification information of M first-type intentions supported by a first application of a terminal and identification information of N second-type intentions supported by the first application, wherein the first application and a second application of a second terminal are a same type of application, each first-type intention is supported by both the first application of the terminal and the second application of the second terminal, each second-type intention is supported by the first application of the terminal and requires a determination of whether the respective second-type intention is supported by the second application of the second terminal, and both M and N are integers greater than or equal to one,
send a first query message to the second terminal using a first communication bearer between the terminal and the second terminal, wherein the first query message carries the identification information of the N second-type intentions,
receive, using the first communication bearer, a first indication message sent by the second terminal, wherein the first indication message carries identification information of X second-type intentions that are supported by the first application and the second application, and X is an integer greater than or equal to one,
display, using the display, a plurality of intentions, wherein the plurality of intentions comprises intentions of the M first-type intentions or intentions of the X second-type intentions, each of the plurality of intentions corresponds to a different performable action corresponding to the first application, a quantity of intentions of the plurality of intentions is L, and L is an integer greater than or equal to two;
determine a to-be-executed intention of the plurality of intentions according to a trigger operation of a user, wherein determining the to-be-executed intention comprises:
recording a T1 moment, wherein the T1 moment is a moment of receiving the first indication message or a second indication message by the terminal, or a moment of displaying Y intentions of the plurality of intentions by the terminal, or any one of moments from a moment of establishing the first communication bearer between the terminal and the second terminal to a moment of displaying the Y intentions;
recording a T2 moment, wherein the T2 moment is a moment of detecting the trigger operation of the user; and
when $$\left(\frac{T2-T1}{T} - \left\lceil \frac{T2-T1}{T} \right\rceil\right) \times T$$

is greater than or equal to a sum of candidate durations of first j−1 intentions, and is less than or equal to a sum of candidate durations of first j intentions, determining that a $j^{th}$ intention is the to-be-executed intention;
wherein T is a total sum of candidate durations of the Y intentions, j is an integer greater than or equal to 1 and less than Y, Y is an integer greater than 1, and ⌈ ⌉ represents a rounding down operation; and
transmit, using a communications interface, data corresponding to the to-be-executed intention to the second terminal.

8. The terminal according to claim 7, wherein to display the plurality of intentions, the processor is configured to: sequentially and cyclically indicate the Y intentions according to a preset sequence, wherein a duration between a moment of indicating a current intention and a moment of indicating a next intention of the current intention is a candidate duration of the current intention, and 1≤Y≤L.

9. The terminal according to claim 7, wherein the processor is further configured to:
before the T1 moment is recorded, determine a candidate duration of each intention in the Y intentions, and add up the candidate duration of each intention in the Y intentions to obtain T; or
determine T, and separately multiply T by a time proportion coefficient of each intention in the L intentions to obtain a candidate duration of each intention in the L intentions.

10. The terminal according to claim 7, wherein to detect the trigger operation of the user, the processor is configured to:
detect that the first communication bearer between the terminal and the second terminal is disconnected; or
detect that a preset gesture operation is performed on a screen of the terminal; or
detect that an operation is performed on a preset button of the terminal; or
detect input preset voice information.

11. The terminal according to claim 7, wherein the M first-type intentions comprise:
transferring a current picture;
transferring a current screenshot;
transferring a current uniform resource locator (URL);
transferring a download address of a current application;
transferring an installation file of a current application; and
transferring an account or configuration information of a current application.

12. The terminal according to claim 7, wherein the first communication bearer is a bearer of a near field communication connection.

13. A non-transitory computer-readable storage medium storing a program to be executed by a processor, the program including instructions for:

obtaining, by a first communications terminal, identification information of M first-type intentions supported by a first application of a first terminal and identification information of N second-type intentions supported by the first application, wherein the first application and a second application of a second communications terminal are a same type of application, each first-type intention is supported by both the first application of the first communications terminal and the second application of the second communications terminal, each second-type intention is supported by the first application of the first communications terminal and requires a determination of whether the respective second-type intention is supported by the second application of the second communications terminal, and both M and N are integers greater than or equal to one;

sending, by the first communications terminal, a first query message to the second communications terminal using a first communication bearer between the first communications terminal and the second communications terminal, wherein the first query message carries the identification information of the N second-type intentions;

receiving, by the first communications terminal using the first communication bearer, a first indication message sent by the second communications terminal, wherein the first indication message carries identification information of X second-type intentions that are supported by the first application and the second application, X is an integer greater than or equal to one;

displaying, by the first communications terminal, a plurality of intentions, wherein the plurality of intentions comprises intentions of the M first-type intentions or intentions of the X second-type intentions, each of the plurality of intentions corresponds to a different performable action corresponding to the first application, a quantity of intentions of the plurality of intentions is L, and L is an integer greater than or equal to two;

determining, by the first communications terminal, a to-be-executed intention of the plurality of intentions according to a trigger operation of a user, wherein determining the to-be-executed intention comprises:
recording a T1 moment, wherein the T1 moment is a moment of receiving the first indication message or a second indication message by the first communications terminal, or a moment of displaying Y intentions of the plurality of intentions by the first communications terminal, or any one of moments from a moment of establishing the first communication bearer between the first communications terminal and the second communications terminal to a moment of displaying the Y intentions;
recording a T2 moment, wherein the T2 moment is a moment of detecting the trigger operation of the user by the first communications terminal; and
when $$\left(\frac{T2-T1}{T} - \left\lceil \frac{T2-T1}{T} \right\rceil\right) \times T$$

is greater than or equal to a sum of candidate duration of first j−1 intentions, and is less than or equal to a sum of candidate duration of first j intentions, determining that a $j^{th}$ intention is the to-be-executed intention, wherein T is a total sum of candidate duration of the Y intentions, j is an integer greater than or equal to 1 and less than Y, Y is an integer greater than 1, and ⌈ ⌉ represents a rounding down operation; and
transmitting, by the first communications terminal, data corresponding to the to-be-executed intention to the second communications terminal.

14. The non-transitory computer-readable storage medium according to claim 13, wherein the instructions for sending, by the first communications terminal, the plurality of intentions further comprises instructions for: displaying, by the first communications terminal, the Y intentions, and sequentially and cyclically indicating, by the first communications terminal, the Y intentions according to a preset sequence, wherein a duration between a moment of indicating a current intention and a moment of indicating a next intention of the current intention is a candidate duration of the current intention, and 1≤Y≤L.

15. The non-transitory computer-readable storage medium according to claim 13, wherein the instructions further comprise instructions for, before recording the T1 moment:
determining, by the first communications terminal, a candidate duration of each intention in the Y intentions, and adding up the candidate duration of each intention in the Y intentions to obtain T; or
determining T, and separately multiplying T by a time proportion coefficient of each intention in the L intentions to obtain a candidate duration of each intention in the L intentions.

16. The non-transitory computer-readable storage medium according to claim 13, wherein the instructions for detecting, by the first communications terminal, the trigger operation of the user further comprise:
detecting, by the first communications terminal, that the first communication bearer between the first communications terminal and the second communications terminal is disconnected; or
detecting, by the first communications terminal, that a preset gesture operation is performed on a screen of the first communications terminal; or
detecting, by the first communications terminal, that an operation is performed on a preset button of the first communications terminal; or
detecting, by the first communications terminal, input preset voice information.

17. The non-transitory computer-readable storage medium according to claim 13, wherein the M first-type intentions comprise:
transferring a current picture;
transferring a current screenshot;
transferring a current uniform resource locator (URL);
transferring a download address of a current application;
transferring an installation file of a current application; or
transferring an account or configuration information of a current application.

18. The non-transitory computer-readable storage medium according to claim 13, wherein the first communication bearer is a near field communication connection.

* * * * *